(12) United States Patent
Häußermann et al.

(10) Patent No.: US 11,462,901 B2
(45) Date of Patent: Oct. 4, 2022

(54) PROTECTIVE CIRCUIT, OPERATING METHOD FOR A PROTECTIVE CIRCUIT AND COMPUTER SYSTEM

(71) Applicant: Fujitsu Technology Solutions Intellectual Property GmbH, Munich (DE)

(72) Inventors: Rudolf Häußermann, Munich (DE); Rainer Staude, Munich (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 122 days.

(21) Appl. No.: 16/755,182

(22) PCT Filed: Mar. 11, 2019

(86) PCT No.: PCT/EP2019/055998
§ 371 (c)(1),
(2) Date: Apr. 10, 2020

(87) PCT Pub. No.: WO2019/206509
PCT Pub. Date: Oct. 31, 2019

(65) Prior Publication Data
US 2021/0194240 A1    Jun. 24, 2021

(30) Foreign Application Priority Data

Apr. 25, 2018 (DE) .................. 10 2018 109 979.7

(51) Int. Cl.
*H02H 7/20*  (2006.01)
*G06F 1/28*  (2006.01)
*H02H 3/20*  (2006.01)

(52) U.S. Cl.
CPC .............. *H02H 7/20* (2013.01); *G06F 1/28* (2013.01); *H02H 3/20* (2013.01)

(58) Field of Classification Search
CPC .............. H02H 7/20; H02H 3/20; G06F 1/28
USPC ....................................... 713/300
See application file for complete search history.

(56) References Cited

U.S. PATENT DOCUMENTS

| 4,536,699 | A | 8/1985 | Baker |
| 4,631,470 | A | 12/1986 | Bingley |
| 5,303,114 | A | 4/1994 | Ferry et al. |
| 2006/0238945 | A1 | 10/2006 | Werback et al. |
| 2011/0075308 | A1* | 3/2011 | Yang ............ G06K 7/0013 361/87 |

FOREIGN PATENT DOCUMENTS

DE    60 211 092 T2    11/2006

OTHER PUBLICATIONS

A Notice of Reason(s) for Rejection dated Mar. 30, 2021, of counterpart Japanese Application No. 2020-519085, along with an English translation.

* cited by examiner

*Primary Examiner* — Tomi Skibinski
(74) *Attorney, Agent, or Firm* — DLA Piper LLP (US)

(57) ABSTRACT

A protective circuit includes an input that provides a first supply voltage, a voltage regulator that provides a second supply voltage based on the first supply voltage, a measuring device that identifies an impedance of the voltage regulator, and a self-locking switching element configured to connect the first supply voltage with the voltage regulator if an impedance of the voltage regulator exceeds a predefined impedance value.

9 Claims, 2 Drawing Sheets

PROTECTIVE CIRCUIT, OPERATING METHOD FOR A PROTECTIVE CIRCUIT AND COMPUTER SYSTEM

TECHNICAL FIELD

This disclosure relates to a protective circuit including an input that provides a first supply voltage and a voltage regulator that provides a second supply voltage based on the first supply voltage.

BACKGROUND

Voltage regulators are, for example, used in computer systems for the purpose of converting a first supply voltage provided by a computer power supply unit into a regulated second supply voltage, with which components of the computer system such as, for example, processors are supplied. Such voltage regulators are, for example, attached onto system boards of such computer systems.

In a malfunction of such a voltage regulator, for example, in a production error of the voltage regulator or the system board, a malfunction of the processor, or damage to the voltage regulator, it is possible that the system board of a computer system onto which the voltage regulator is attached is destroyed. An overheating of the voltage regulator or of the system board does not arise infrequently, which can lead to a development of smoke, or even to a fire in the computer system.

SUMMARY

We provide a protective circuit including an input that provides a first supply voltage, a voltage regulator that provides a second supply voltage based on the first supply voltage, a measuring device that identifies an impedance of the voltage regulator, and a self-locking switching element configured to connect the first supply voltage with the voltage regulator if an impedance of the voltage regulator exceeds a predefined impedance value.

We also provide a method of operating a protective circuit including an input that provides a first supply voltage, a voltage regulator that provides a second supply voltage based on the first supply voltage, a measuring device that identifies an impedance of the voltage regulator, and a self-locking switching element, the method including measuring an impedance of the voltage regulator, and closing the switching element if the measured impedance exceeds a predefined impedance value so that the voltage regulator is connected to the first supply voltage.

We further provide a computer system including a computer power supply unit and a system board with the protective circuit including an input that provides a first supply voltage, a voltage regulator that provides a second supply voltage based on the first supply voltage, a measuring device that identifies an impedance of the voltage regulator, and a self-locking switching element configured to connect the first supply voltage with the voltage regulator if an impedance of the voltage regulator exceeds a predefined impedance value, wherein the computer power supply unit provides the first supply voltage at the input of the protective circuit.

Figure 1:
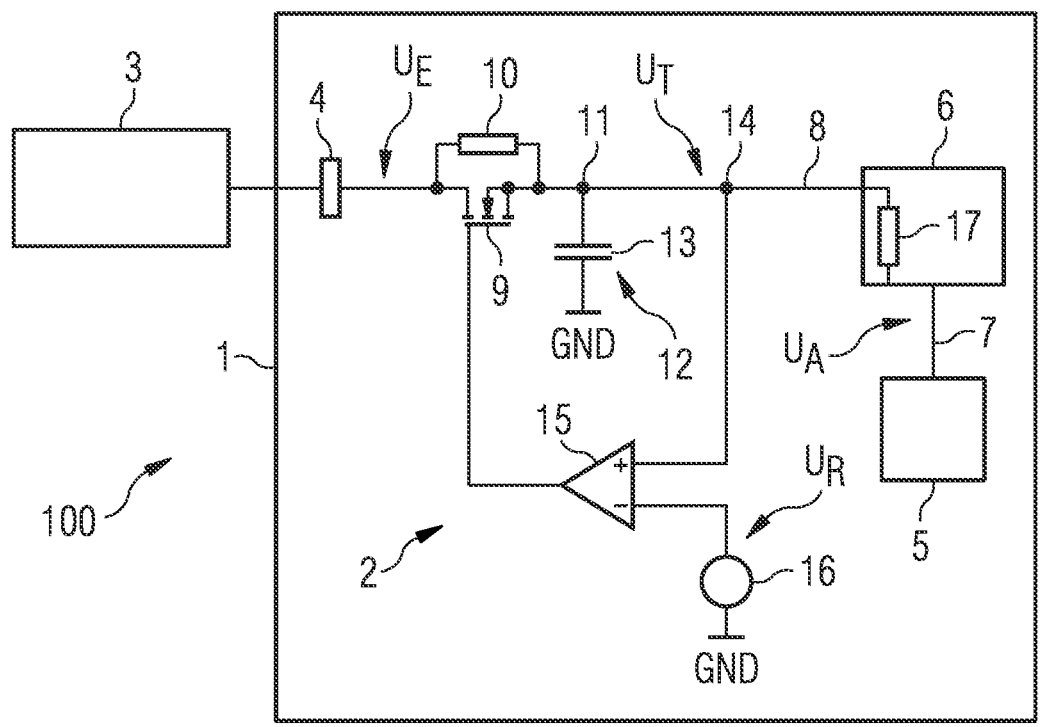
FIG. 1 is a schematic illustration of an assembly with a protective circuit according to an example.

LIST OF REFERENCE CHARACTERS 1 system board
2 protective circuit
3 computer power supply unit
4 input
5 processor
6 voltage regulator
7 first electrical line
8 second electrical line
9 MOSFET
10 test resistor
11 first node
12 low-pass filter
13 capacitor
14 second node
15 comparator
16 reference voltage source
17 resistor
100 assembly
GND ground potential
$U_E$ first supply voltage
$U_A$ second supply voltage
$U_R$ reference voltage
$U_T$ test voltage
$t_0, t_1, t_2, t_3$ point in time

DETAILED DESCRIPTION

Our protective circuit includes an input that provides a first supply voltage, and a voltage regulator that provides a second supply voltage based on the first supply voltage. The protective circuit further includes a measuring device that identifies an impedance of the voltage regulator, and a self-locking switching element configured to connect the first supply voltage with the voltage regulator if an impedance of the voltage regulator exceeds a predefined impedance value.

An advantage is that the first supply voltage is fully applied to the voltage regulator only if a short-circuit as well as other malfunctions of the voltage regulator, as a consequence, would result in an impedance lower than a known target value of the impedance, is precluded. In this way, an application of the first supply voltage, provided at the input, to a defective voltage regulator is prevented. Thus, the occurrence of the above-mentioned problems, for example, can not arise when applying the first supply voltage to a defective voltage regulator. In our protective circuit, protection of the voltage regulator and the system board is ensured directly after providing the first supply voltage to the input of the protective circuit.

The measuring device may include a test resistor that bridges the switching element so that the test resistor and the voltage regulator form a voltage divider. An advantage is that the protective circuit requires no additional voltage supply to identify the impedance of the voltage regulator. In a connecting of the input with a voltage source to provide the first supply voltage, a test current is fed into the protective circuit via the test resistor, while the switching element locks. The test current is used for the purpose of identifying the impedance of the voltage regulator.

The measuring device may further include a comparator configured to compare a test voltage at a node between the test resistor and the voltage regulator with a reference voltage and provide a control signal for the switching element at an output of the comparator, if the test voltage exceeds the reference voltage. An advantage is that even small deviations of the measured impedance of the voltage regulator from a target value of the impedance of the voltage regulator can be registered.

We also provide an operating method for a protective circuit including an input that provides a first supply voltage, a voltage regulator that provides a second supply voltage based on the first supply voltage, a measuring device that identifies an impedance of the voltage regulator, and a self-locking switching element. The operating method includes the steps of:

measuring an impedance of the voltage regulator, and closing the switching element if the measured impedance exceeds a predefined impedance value so that the voltage regulator is connected to the first supply voltage.

Measuring the impedance of the voltage regulator may occur directly after providing the first supply voltage to the input of the protective circuit. An advantage is that the impedance of the voltage regulator can already be measured directly after a build-up of the first supply voltage at the input of the protective circuit. In this way, no or only insignificant temporal delays are caused during a switching-on process of a device in which the protective circuit is installed by the operating method for the protective circuit.

We further provide a computer system including a computer power supply unit and a system board with our protective circuit. The computer power supply unit provides the first supply voltage at the input of the protective circuit.

Further advantageous examples are described in the appended claims as well as the subsequent description. The examples are described based on the attached figures. In the figures, same reference characters are used for elements with substantially same functions, these elements do not have to be identical in all details.

FIG. 1 shows a schematic illustration of an assembly 100 consisting of a system board 1 with a protective circuit 2 according to an example and a computer power supply unit 3. In this example, the system board 1 is a motherboard of a computer system. The computer power supply unit 3 electrically connects to the system board 1. The computer power supply unit 3 is, for example, an internal power supply unit such as in a desktop computer, or an external power supply unit such as in a laptop or a tablet computer.

An input 4 that provides a first supply voltage $U_E$ is arranged on the system board 1. The computer power supply unit 3 is connected to the input 4 and provides the first supply voltage $U_E$ to the input 4. Moreover, a processor 5 and a voltage regulator 6 are arranged on the system board 1. The voltage regulator 6 is connected with the processor 5 via a first electrical line 7 and provides a second supply voltage $U_A$, in this example, a regulated core voltage for the processor 5. The first supply voltage $U_E$ provided at the input, amounts to 12 V in this example.

The input 4 is connected with the voltage regulator 6 via a second electrical line 8. A self-locking metal-oxide semiconductor field-effect transistor, MOSFET, 9, is arranged in the second electrical line 8. The self-locking MOSFET 9 interrupts a current flow in the second electrical line 8 if no gate voltage is applied on a gate of the MOSFET 9.

The protective circuit 2 further includes a test resistor 10 that bridges the MOSFET 9. MOSFET 9 and test resistor 10 are connected in parallel to one another. The parallel connection of test resistor 10 and MOSFET 9 is connected in series with the voltage regulator 6 so that test resistor 10 and voltage regulator 6 form a voltage divider in a locking MOSFET 9.

Further, a low-pass filter 12 is connected to the second electrical line 8 at a first node 11 between the voltage regulator 6 and the parallel connection of test resistor 10 and MOSFET 9. The low-pass filter 12 comprises a capacitor 13 connected between the first node 11 and a ground potential GND. The low-pass filter 12 filters errors generated by the voltage regulator 6 so that these errors are not transmitted on to the first voltage supply $U_E$ made available at the input 4.

Moreover, a second node 14 is arranged in the second electrical line 8, between the voltage regulator 6 and the parallel connection of test resistor 10 and MOSFET 9, which node is electrically connected with a positive input of a comparator 15. A reference voltage $U_R$ is applied to a negative input of the comparator 15, which is provided by a reference voltage source 16. The reference voltage $U_R$ is, for example, an internal reference voltage of a microcontroller. For example, the reference voltage $U_R$ is generated from the first supply voltage $U_E$ through a voltage divider with a Zener diode. An output of the comparator 15 connects to the gate of the MOSFET 9.

A resistor 17 is drawn in the voltage regulator 6. This resistor 17 represents no explicit component in the protective circuit 2, but rather symbolizes an impedance of the voltage regulator 6.

Figure 2:
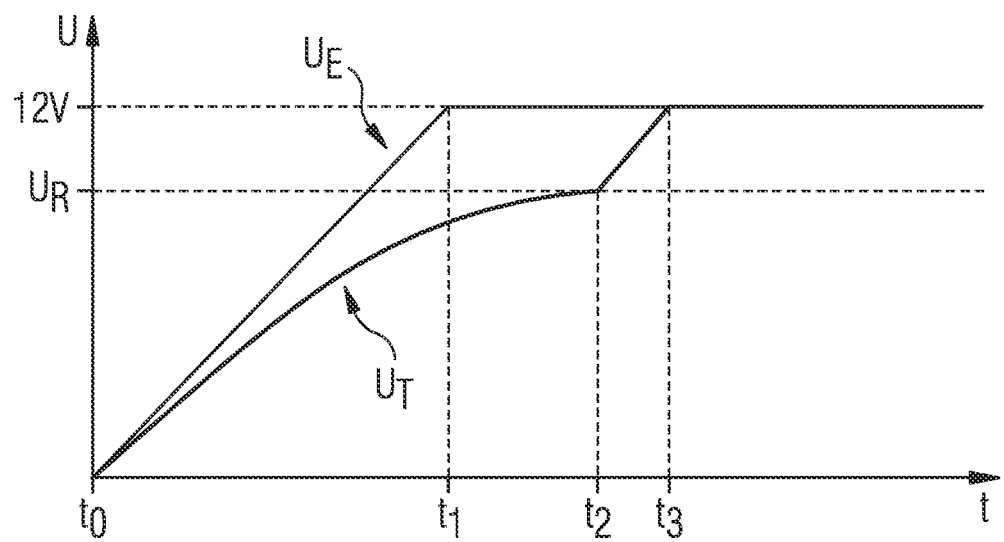
FIG. 2 is a schematic illustration of voltage curves in the assembly according to FIG. 1, during a switching-on process in a normal situation.
Figure 3:
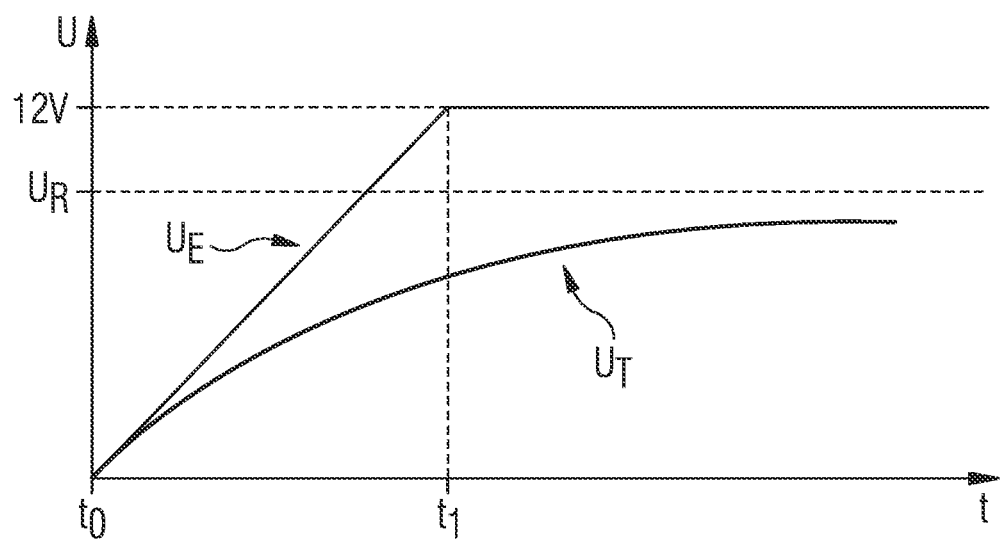
FIG. 3 is a schematic illustration of voltage curves in the assembly according to FIG. 1, during a switching-on process in a malfunction.

Functioning of the protective circuit 2 is described in detail based on FIGS. 2 and 3.

FIGS. 2 and 3, respectively, show schematic illustrations of voltage curves of the first supply voltage $U_E$ and a test voltage $U_T$ tapped at the second node 14, which voltage is compared to the reference voltage $U_R$ by the comparator 15. The voltage curves are respectively plotted over time during switching-on processes of the assembly 100 according to FIG. 1. FIG. 2 shows the voltage curves in a normal situation in which the voltage regulator 6 has no defect on the system board 1. FIG. 3 shows the voltage curves in an error situation in which the voltage regulator 6 on the system board 1 has a defect.

According to FIG. 2, the computer power supply unit 3 of the assembly 100 is switched on at a point in time $t_0$. The first supply voltage $U_E$ provided by the computer supply unit 3 at the input 4 increases continuously up to a point in time $t_1$ to a value of 12 V. The 12 V represent a target value of the first supply voltage $U_E$. The self-locking MOSFET 9 locks at these points in time $t_0$, $t_1$ so that a current in the second electrical line 8 can only flow via the test resistor 10. Test resistor 10 and voltage regulator 6 form a voltage divider so that a voltage value dependent upon the impedance of the voltage regulator 6 and a resistance value of the test resistor 10 settles for the test voltage $U_T$ at the second node 14.

The comparator 15 compares the test voltage $U_T$ to the reference voltage $U_R$ and, according to FIG. 2, registers an increase of the test voltage $U_T$ over the reference voltage $U_R$ at the point in time $t_2$. This signals that no defects are present in the voltage regulator 6 which lead to a too low impedance of the voltage regulator 6. Thereupon, the comparator 15 outputs a control signal at its output, which switches the MOSFET 9 from locked to conducting. The MOSFET 9 thus connects the input 4 with the voltage regulator 6 so that a current in the second electrical line 8 flows via the MOSFET 9 and the test resistor 10 is bridged.

Until the point in time $t_3$ the test voltage $U_T$ applied on the second node 14 thus also increases to 12 V. From the point in time $t_3$, test voltage $U_T$ and first supply voltage $U_E$ are equal since voltage losses at the MOSFET 9 were neglected in the schematic illustration of the voltage curves. As from the point in time $t_3$, the voltage regulator 6 is supplied with the required voltage by the first voltage supply $U_E$.

According to FIG. 3, the computer power supply unit 3 of the assembly 100 is likewise switched on at a point in time $t_0$. The first supply voltage $U_E$ continuously increases here as well, up until a point in time $t_1$, to a value of 12 V. The self-locking MOSFET 9 locks at these points in time $t_0$, $t_1$ so that a current can only flow into the second electrical line 8 via the test resistor 10.

According to FIG. 3, the voltage regulator 6 has a defect, however, so that the test voltage $U_T$ does not reach the value of the reference voltage $U_R$ at the second node 14. The impedance of the voltage regulator 6 is too low. A too-low impedance of the voltage regulator 6 can have a damaging of the system board 1 as a result if the entire first supply voltage $U_E$, amounting to 12 V, is applied to the voltage regulator 6. As the test voltage $U_T$ remains smaller than the reference voltage $U_E$, according to FIG. 3, no control signal is provided at the output of the comparator 15 so that the MOSFET 9 remains in the locking state. In this example, i.e., an error situation, the entire first supply voltage $U_E$ of 12 V is not applied to the voltage regulator 6, which prevents a damaging of the system board 1 due to defective semiconductor elements in the voltage regulator 6.

In the example shown here, a resistance value of the test resistor 10 of 825 Q is selected. Furthermore, a voltage value of 8.7 V is selected for the reference voltage $U_R$. The reference voltage $U_R$ is selected such that it lies just below the value which settles in an error-free voltage regulator 6 and locking MOSFET 9 at the second node 14. The resistance value of the test resistor 10 ensures a reliable identifying of the impedance of the voltage regulator 6, without a too-high test current being fed into the second electrical line 8 via the test resistor 10, which in a defective voltage regulator 6 could lead to the above-mentioned problems. The resistance value of the test resistor 10 is thus furthermore so high that, in a conductive MOSFET 9, practically no more current flows through the test resistor 10.

In this example, that is in a selected reference voltage $U_R$ of 8.7 V and a test resistor 10 of 825 Q, a leakage current of 4 mA can already be registered in the voltage regulator 6 as a defect of the voltage regulator 6. In a leakage current of 4 mA in the voltage regulator 6, the test voltage $U_T$ does not exceed the reference voltage $U_R$ so that the MOSFET 9 is not switched from locking to conductive. For example, a fuse could not provide both a reliable operation and a rapid triggering of the fuse, in values of a current being comparatively close to one another, through the voltage regulator 6 in the normal situation, and of a current through the voltage regulator 6 in the error situation.

The protective circuit 2 ensures a protection of the system board 1 during a time period from a switching on of the computer power supply unit 3 until a reviewing of the impedance of the voltage regulator 6. Other protective devices, for example, an overcurrent protection device of the computer power supply unit 3 or monitoring circuitry in the voltage regulator 6 itself, are usually not active directly after providing of the first supply voltage $U_E$ at the input 4, for example, for around 20 ms to 100 ms.

Alternatively, a protective circuit may be arranged on a system board of a laptop or tablet computer, wherein the first supply voltage is provided by a rechargeable battery of the laptop or table computer. In this example, the protective circuit also constitutes a protection of the rechargeable battery in addition to the protection of the system board.

The invention claimed is:

1. A protective circuit comprises:
   an input that provides a first supply voltage,
   a voltage regulator that provides a second supply voltage based on the first supply voltage,
   a measuring device that identifies an impedance of the voltage regulator, and
   a self-locking switching element configured to connect the first supply voltage with the voltage regulator if an impedance of the voltage regulator exceeds a predefined impedance value,
   wherein the measuring device includes a test resistor that bridges the switching element so that the test resistor and the voltage regulator form a voltage divider.

2. The protective circuit according to claim 1, wherein the switching element includes an electrical semiconductor switching element or a metal oxide semiconductor field-effect transistor, MOSFET.

3. The protective circuit according to claim 1, wherein the measuring device further includes a comparator configured to compare a test voltage at a node between the test resistor and the voltage regulator to a reference voltage, and provide a control signal for the switching element at an output of the comparator if the test voltage exceeds the reference voltage.

4. The protective circuit according to claim 1, wherein the input that provides the first supply voltage is configured to be connected to a voltage rail of a computer power supply unit.

5. A computer system including a computer power supply unit and a system board with the protective circuit according to claim 1, wherein the computer power supply unit provides the first supply voltage at the input of the protective circuit.

6. A method of operating a protective circuit including an input that provides a first supply voltage, a voltage regulator that provides a second supply voltage based on the first supply voltage, a measuring device that identifies an impedance of the voltage regulator, and a self-locking switching element, wherein the measuring device includes a test resistor that bridges the switching element so that the test resistor and the voltage regulator form a voltage divider, the method comprising:
   measuring an impedance of the voltage regulator, wherein measuring the impedance of the voltage regulator comprises supplying a test current at the input of the protective circuit via the test resistor that bridges the switching element, and
   closing the switching element if the measured impedance exceeds a predefined impedance value so that the voltage regulator is connected to the first supply voltage.

7. The method according to claim 6, wherein measuring the impedance of the voltage regulator occurs directly after providing the first supply voltage at the input of the protective circuit.

8. The method according to claim 6, wherein measuring the impedance of the voltage regulator further comprises:
   comparing a test voltage present at a node between the test resistor and the voltage regulator, with a reference voltage.

9. The method according to claim 8, wherein closing the switching element further comprises:

providing a switching signal to close the switching element to the switching element if the test voltage exceeds the reference voltage.

* * * * *